US006238295B1

(12) United States Patent
Bondioli

(10) Patent No.: US 6,238,295 B1
(45) Date of Patent: May 29, 2001

(54) FORK FOR TRANSMISSION WITH A SPLINED SHAFT

(76) Inventor: Edi Bondioli, Via Gina Blanchi 2, 46029 Suzzara, Mantova (IT)

( * ) Notice: Subject to any disclaimer, the term of this patent is extended or adjusted under 35 U.S.C. 154(b) by 0 days.

(21) Appl. No.: 09/214,350

(22) PCT Filed: Jul. 28, 1997

(86) PCT No.: PCT/IT97/00193
§ 371 Date: Dec. 29, 1998
§ 102(e) Date: Dec. 29, 1998

(87) PCT Pub. No.: WO98/06954
PCT Pub. Date: Feb. 19, 1998

(30) Foreign Application Priority Data

Aug. 14, 1996 (IT) .................................. FI96A0197

(51) Int. Cl.[7] ........................................ F16D 3/16
(52) U.S. Cl. ..................... 464/134; 403/93; 464/901
(58) Field of Search ................................. 464/901, 172, 464/162, 170, 171; 403/23, 51, 11, 288, 95, 97, 92, 93; 74/609, 612, 613

(56) References Cited

U.S. PATENT DOCUMENTS

| 2,448,278 | * | 8/1948 | Ronning .............................. 464/901 |
| 2,696,089 | * | 12/1954 | Heth .................................... 464/901 |
| 4,091,640 | * | 5/1978 | Olkowski, Jr. et al. ............. 464/901 |
| 4,501,573 | * | 2/1985 | Bondioli ............................. 464/172 |
| 4,687,367 | * | 8/1987 | Bondioli ............................. 403/322 |
| 5,169,358 | * | 12/1992 | Bondioli ............................. 464/172 |

* cited by examiner

Primary Examiner—Lynne H. Browne
Assistant Examiner—Kenn Thompson
(74) Attorney, Agent, or Firm—McGlew and Tuttle, P.C.

(57) ABSTRACT

The splined shaft is locked in the splined seat of the fork by means of a push-button immobilizing element (31) designed to engage tangentially in the said annular recess; the immobilizing element (31) is accommodated in a housing (29) formed in the base (23) of the fork and is stressed elastically by a spring (33) in the immobilizing position, in which it projects, so that it can be pressed manually in order to unlock it; around the said housing (29), the base (23) of the fork has an enlarged portion (27) in which a cavity (37) is formed, within which the push-button (31A) of the immobilizing element projects when it is in the immobilizing position, while still remaining enclosed within the said cavity (37).

10 Claims, 4 Drawing Sheets

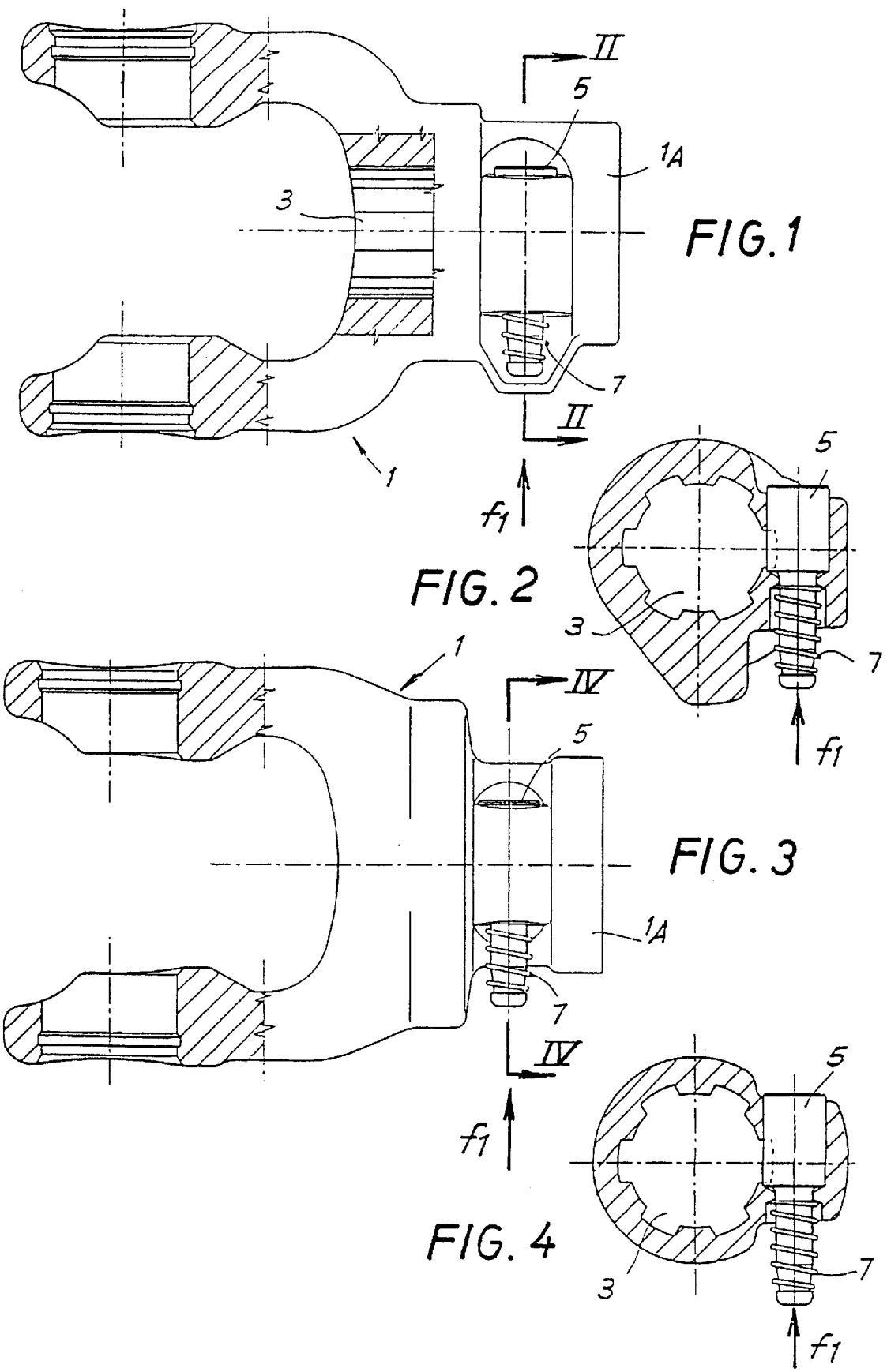

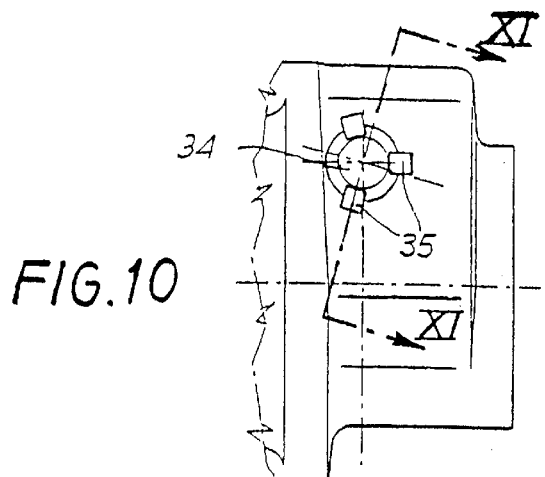
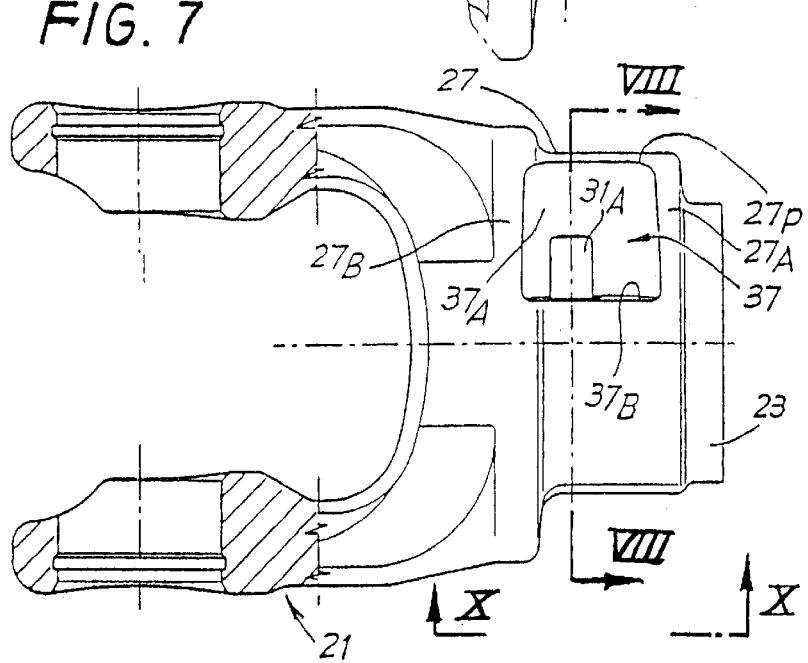
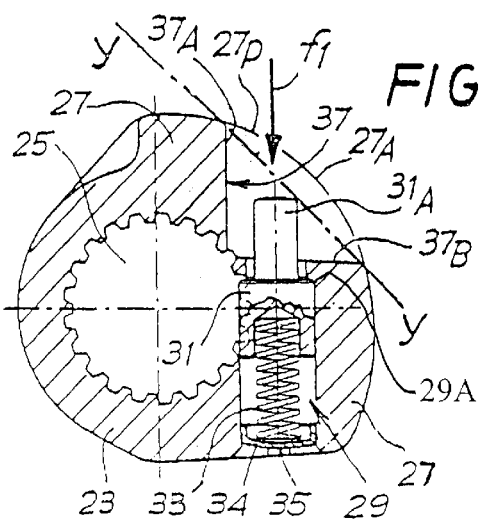
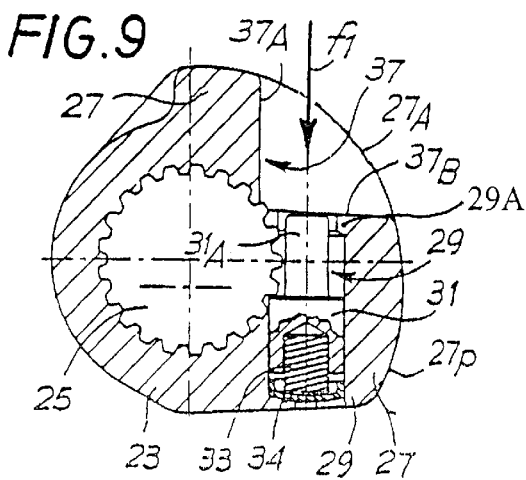

FORK FOR TRANSMISSION WITH A SPLINED SHAFT

The invention relates to a specific improvement designed to prevent accidents—in compliance with current legislation—with a view to avoiding the presence of projections, which could constitute a hazard by catching accidentally, in rotating members of a mechanical transmission, particularly in a fork of a universal joint for a mechanical transmission. These transmissions comprise a splined shaft with an annular recess for axial locking in the splined seat of the fork by means of a push-button immobilizing element, designed to engage tangentially in the said annular recess, the immobilizing element being accommodated in a housing formed in the base of the fork; the said push-button immobilizing element is stressed elastically in the immobilizing position, in which it projects, and can be pressed down manually in order to unlock it. The document NL-7 005 057 is representative of said state of the art.

In order to avoid the risk of the immobilizing element catching when it projects in the immobilizing position, around the said housing, the base of the fork has an enlarged portion forming a cavity: according to the invention the said immobilizing element projects within the said cavity when it is in the immobilizing position, while still remaining enclosed within the said cavity; the cavity is large enough to allow the said element to be pressed down in order to unlock it.

In an advantageous embodiment, the immobilizing element is stressed to make it project out of the said housing by a spring inside the housing, which is in the form of a blind hole. The immobilizing element can be held in its housing by means of at least one stop piece formed in the said housing, while the spring reacts against a plate held in the mouth of the housing, for example by plastic deformations made in the material along the front edge of the said housing.

The said cavity in the enlarged portion can be essentially dihedral in shape with two surfaces which are approximately at right angles to each other and with two sides which follow the external profile of the said enlarged portion which is approximately in the shape of an arc of a circle; the components are designed such that the push-button part of the said immobilizing element is always contained inside the profile of the said sides.

A better understanding of the invention will be gained by following the description and the appended drawing, which shows a non-limiting practical example of the said invention. In the drawing:

FIGS. 1 and 2; 3 and 4; 5 and 6 show, in partially sectioned side views and in cross-sections on II—II in FIG. 1, IV—IV in FIG. 3 and VI—VI in FIG. 5, known embodiments of the fork;

FIG. 7 shows a partially sectioned side view of the fork according to the invention;

FIG. 8 shows a cross-section on VIII—VIII in FIG. 7 with the immobilizing element in the active, i.e. immobilizing, state;

FIG. 9 is similar to FIG. 8 but shows the immobilizing element in the unlocked state;

FIG. 10 shows a localized view on the plane X—X in FIG. 7;

Figure 5:
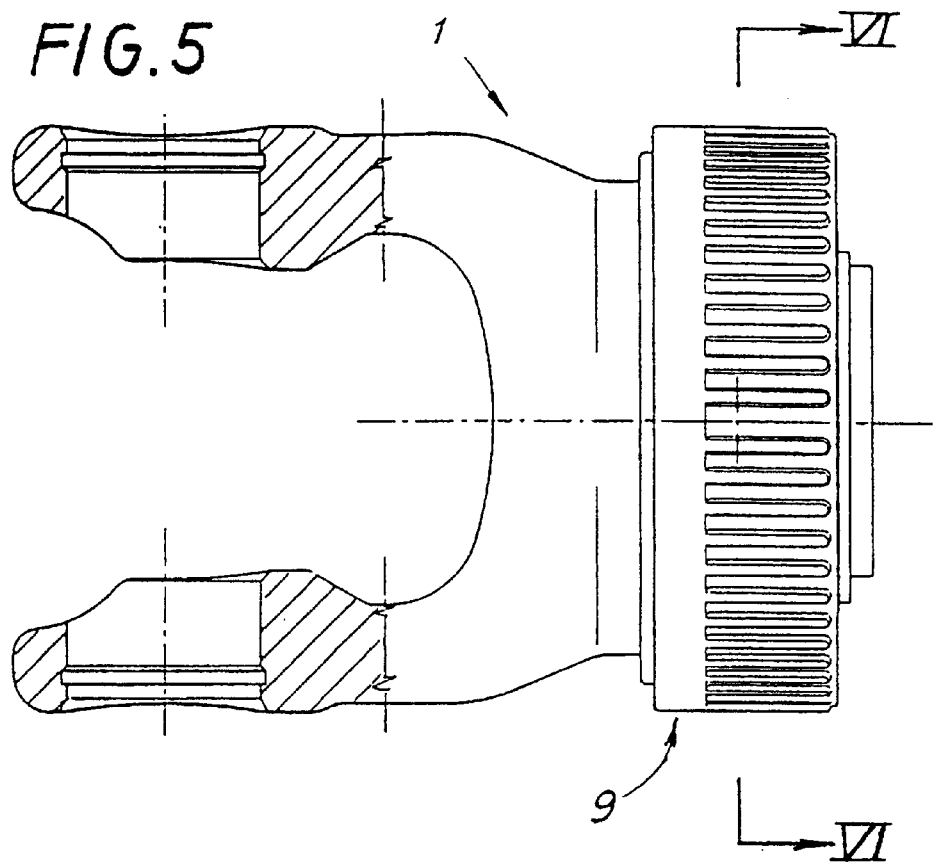
Figure 6:
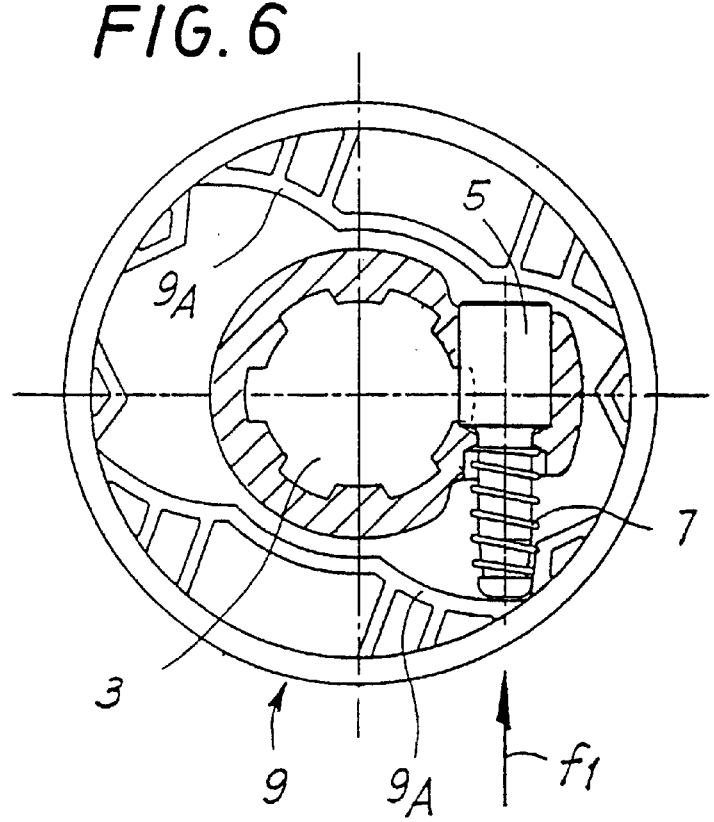
Figure 11:
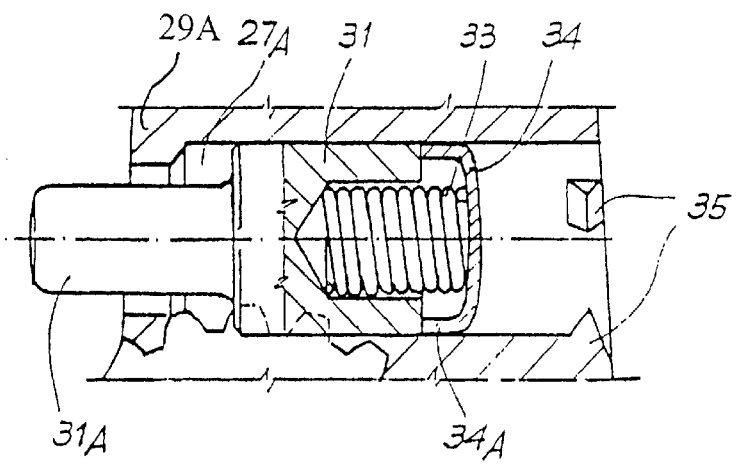
FIG. 11 shows a partial localized cross-section on XI—XI in FIG. 10.
Figure 13:
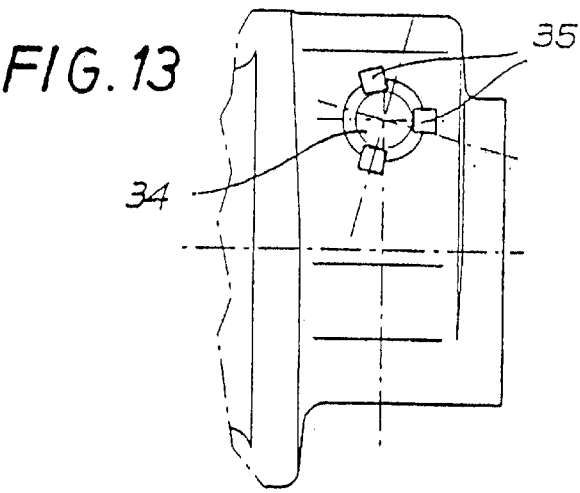
FIGS. 12 and 13 show a variation on the positioning of the push-button, in a side view and in the localized view on XIII—XIII in FIG. 12.
Figure 12:
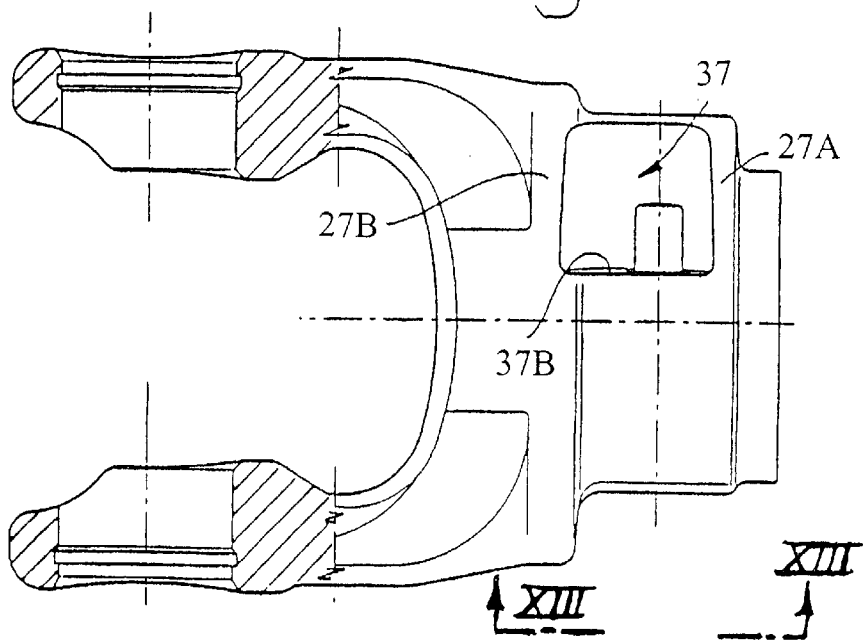

FIGS. 1 to 6 show forks 1 having essentially the same morphology in the various figures: a splined seat 3 for accommodating the splined shaft, which is immobilized by means of an immobilizing element 5 accommodated in a housing in the base 1A of the fork; this housing is essentially tangential to the splined seat 3 for the splined shaft; the immobilizing element 5 can slide in the said housing and engage with the seat 3 in the immobilizing state when it is stressed by a spring 7; by pushing in the direction of the arrow f1 against the action of the spring 7, the immobilizing element 5 is moved into the unlocked state on account of the fact that it ceases to engage with the seat as a result of the difference in diameter between that part of the immobilizing element 5 that slides in the housing and the narrower part which is enclosed by the spring 7 and constitutes the push-button, being actuated in the direction of the arrow f1 by the operator with the finger of one hand when he wishes to disengage the shaft from the fork. The projecting pin part of the immobilizing element 5, which is enclosed by the spring 7, constitutes a hazardous projection since it could catch during rotation and drag an item of clothing, a piece of fabric, or some other article, which could then cause injury to the operator if his concentration has inadvertently lapsed. FIGS. 5 and 6 illustrate one solution to this disadvantage consisting in providing an annular control member 9 which surrounds the base of the fork and the inside of which is shaped so as to cover the projecting part of the immobilizing element 5 while still allowing this immobilizing member to be moved (against the action of the spring 7) by rotating the member 9 so that a profile 9A inside the said member 9 acts on the push-button, as can be clearly seen in FIG. 6.

In order to solve the abovementioned problem in a simpler manner and avoid the disadvantages associated with it, a solution such as that shown in FIGS. 7 to 11 is proposed. In this embodiment the fork 21 has a roughly asymmetrical enlarged portion 27 in its base 23—in which the splined seat 25 for the splined shaft is formed—and it is in this enlarged portion 27 that the housing 29 for the push-button immobilizing element 31 is formed; the said housing 29 is a through housing and is tangential to the splined seat 25 and is formed in the shape of a cylinder, with an annular stop piece 29A at the upper exit edge when looking at FIGS. 8 and 9. Accommodated in the housing 29 is a compression spring 33 which is at least also partially accommodated in a blind axial hole formed in the bottom of the immobilizing element 31, at the opposite end to the extension forming the push-button 31A which is provided in the immobilizing element 31 in order to move it manually against the elastic stressing action of the spring 33. The spring 33 reacts against a plate 34 which is held by stop pieces 35 formed along the edge of the hole constituting the housing 29; these stop pieces are produced by plastic deformation of the material of the fork 21, 23. When the shaft is to be unlocked from its splined seat 25, the area of the push-button 31A which has a smaller diameter is made to engage with the seat, rather than the part of the immobilizing member 31 with the larger diameter; the manual action is performed in the direction of the arrow f1 in a manner similar to that used in the known embodiments of FIGS. 1 to 4 and indirectly with the embodiment of FIGS. 5 and 6. The immobilizing position of the immobilizing element 31 in the housing 29 is defined by the annular stop piece 27A which is machined in the housing 29.

The plate 34 has a cylindrical peripheral edge 34A which acts as a guide to ensure that the plate 34 slides smoothly in the cylindrical housing 29, without the risk of catching.

The fact that the housing 29 is made in the form of a through housing means that it is possible to act on the plate 34 in the event of the push-button element 31, 31A jamming in the housing as a result of any deformations the said element may have undergone during use; it is thus possible to take the necessary steps in order to avoid problems and hazardous situations.

The push-button 31A for controlling the immobilizing element 31 projects inside a cavity 37 formed in the enlarged portion 27; this cavity 37 is essentially defined by two surfaces 37A and 37B which are essentially almost at right angles to each other and by two sides 27A and 27B which follow the arched convex profile 27P that externally defines the enlarged portion 27. The extent to which the push-button part 31A of the immobilizing element 31 projects, in the immobilizing state shown in FIG. 8, is contained well inside the cavity 37 and is even within the line Y—Y, indicated by dashes in FIG. 8, that joins the external edges of the two surfaces 37A and 37B.

Under these circumstances, even though the push-button for controlling the immobilizing element projects, the fork does not have any elements that could catch; on the contrary, the control push-button 31A is fully contained inside the cavity 37; with the cavity 37 and the enlarged portion 27 in which this cavity is formed there is virtually no risk of any elements catching on clothing or some other item, and thus the possibility of causing accidental injury to operators is eliminated.

The width of the cavity 37 between the two sides 27A and 27B is large enough to allow the operator to use one of his fingers (or his thumb) to act on the pin 31A of the immobilizing element in order to unlock the element against the action of the spring 33.

Although it is possible to have a cavity 37 that is relatively narrow but still wide enough to allow the pin 31A which is positioned symmetrically therein to be operated, in the embodiment illustrated (see in particular FIGS. 7, 8, 12 and 13) the cavity 37 delimited by the sides 27A and 27B is relatively wide. The housing 29 can then be formed in one or other of two (or more) positions along the axis of the seat for the splined shaft; this then makes it possible to position the shaft even when it has annular immobilizing recesses positioned at different distances from the end of the said shaft.

It should be understood that the drawing shows only one example given solely by way of practical demonstration of the invention and that it is possible to vary the forms and arrangements of the latter without thereby departing from the concept underlying the said invention. Any reference numerals in the appended claims have the purpose of facilitating the reading of the claims with reference to the description and the drawing and do not restrict the scope of protection represented by the claims.

What is claimed is:

1. A fork for a transmission, the fork comprising:
   a splined seat with an annular recess for receiving a splined shaft;
   a push-button immobilizing element engaging tangentially in said annular recess for axial locking in of the splined shaft;
   a fork base with a housing formed therein, the immobilizing element being accommodated in said housing;
   an elastic element, said push-button immobilizing element being stressed elastically in an immobilizing position and being movable to be pressed down manually in order to unlock the splined shaft;
   a base enlarged portion adjacent to said housing, said base enlarged portion defining a cavity, said base enlarged portion having an outer peripheral surface located outwardly of a surface of said cavity, said push-button immobilizing element projecting outwardly of said surface of said cavity in the immobilizing position and not projecting beyond said base enlarged portion outer peripheral surface in the immobilizing position whereby said cavity is large enough to allow said push-button immobilizing element to be pressed down in order to unlock the splined shaft.

2. A fork according to claim 1, wherein:
   said surface of said cavity includes a first surface portion and a second surface portion; and
   said enlarged portion surface is dihedral and includes a first surface and a second surface, said first and second surfaces of said cavity being at approximate right angles to each other and to said first surface and said second surface of said enlarged portion whereby said first surface and said second surface of said enlarged portion follow along a curved external profile of said enlarged portion, said push-button immobilizing element being contained in the profile of said first surface and said second surface of said enlarged portion.

3. A fork according to claim 1, wherein said elastic element is a spring stressing said immobilizing element inside said housing to make said immobilizing element project out of said housing.

4. A fork according to claim 2, wherein said immobilizing element is stressed by said elastic element inside said housing to make said immobilizing element project out of said housing.

5. A fork according to claim 1, further comprising a stop piece projecting into said housing; and
   a plate, said stop piece holding said immobilizing element and said elastic element resting on said plate guided slidably in said housing said plate being held by plastic deformations in a housing material along the edge of said housing.

6. A fork according to claim 2, further comprising a stop piece projecting into said housing; and a plate, said stop piece holding said immobilizing element and said elastic element resting on said plate guided slidably in said housing said plate being held by plastic deformations in a housing material along the edge of said housing.

7. A fork according to claim 3, further comprising a plate having a peripheral edge acting as a guide.

8. A fork according to claim 4, further comprising a plate having a peripheral edge acting as a guide.

9. A fork for a transmission, the fork comprising:
   a splined seat with an annular recess for receiving a splined shaft;
   a push-button immobilizing element engaging tangentially in said annular recess for axial locking in of the splined shaft;
   a housing formed in the base of the fork, the immobilizing element being accommodated in said housing;
   a spring inside said housing, said spring applying stress to said push-button immobilizing element such that said push-button immobilizing element protrudes out from said housing, said push-button immobilizing element being stressed elastically in an immobilizing position and being movable to be pressed down manually in order to unlock the splined shaft;
   a fork base having an enlarged portion adjacent to said housing, said enlarged portion defining a cavity, said base enlarged portion having an outer peripheral side located outwardly of a side of said cavity, said push-button immobilizing element projecting outwardly of said side of said cavity in the immobilizing position and not projecting beyond said enlarged portion outer peripheral side in the immobilizing position whereby said cavity is large enough to allow said push-button immobilizing element to be pressed down in order to unlock the splined shaft;

a stop piece projecting into said housing and holding said push-button immobilizing element in said housing; and a plate receiving said spring, said plate being held by plastic deformations in material of said housing along an edge of said housing, whereby said plate is slidably guided in said housing.

10. A fork for a transmission, the fork comprising:

a splined seat with an annular recess for receiving a splined shaft;

a push-button immobilizing element engaging tangentially in said annular recess for axial locking in of the splined shaft;

a housing formed in the base of the fork, the immobilizing element being accommodated in said housing;

an elastic element, said push-button immobilizing element being stressed elastically in an immobilizing position and being movable to be pressed down manually in order to unlock the splined shaft;

a fork base having an enlarged portion adjacent to said housing, said base enlarged portion defining a cavity, said base enlarged portion having an outer peripheral surface located outwardly of a surface of said cavity, said push-button immobilizing element projecting outwardly of said surface of said cavity in the immobilizing position and not projecting beyond said base enlarged portion outer peripheral surface in the immobilizing position whereby said cavity is large enough to allow said push-button immobilizing element to be pressed down in order to unlock the splined shaft, said cavity being dihedral in shape and having a side and another side and said enlarged portion having a side and another side which are at approximate right angles to said cavity side and said cavity another side of said cavity wherein said enlarged portion side and said enlarged portion another side follow along said outer peripheral surface of said enlarged portion whereby said push-button immobilizing element is contained inside a profile of said enlarged portion side and said enlarged portion another side.

* * * * *